United States Patent [19]
Janson et al.
[11] 3,787,773
[45] Jan. 22, 1974

[54] SWITCHABLE ANTENNA CIRCUIT FOR TELEVISION PROVIDING FOR RECEPTION OF UHF AND VHF SIGNALS UTILIZING A SINGLE BUILT-IN MONOPOLE ANTENNA OR TWO EXTERNAL ANTENNAS

[75] Inventors: Eugene Ernst Janson; Max Ward Muterspaugh, both of Indianapolis, Ind.

[73] Assignee: RCA Corporation, New York, N.Y.

[22] Filed: Sept. 11, 1972

[21] Appl. No.: 288,203

[52] U.S. Cl. .................. 325/370, 325/372, 325/379, 325/458, 325/462, 334/1

[51] Int. Cl. .................. H04b 1/06

[58] Field of Search ... 325/370, 372, 458, 315, 316, 325/379, 462; 343/725, 742, 777; 334/1

[56] References Cited

UNITED STATES PATENTS

| | | | |
|---|---|---|---|
| 2,772,354 | 11/1956 | Browder | 325/370 |
| 2,538,497 | 1/1951 | Bass | 325/370 |
| 2,836,711 | 5/1958 | Krepps | 325/370 |
| 3,469,194 | 9/1969 | Osborn | 325/370 |

*Primary Examiner*—Albert J. Mayer
*Attorney, Agent, or Firm*—Eugene M. Whitacre

[57] ABSTRACT

A television receiver for UHF and VHF television reception includes a built-in monopole antenna and first and second pairs of external antenna terminals for connection to external UHF and VHF antennas, respectively. A switch is provided which is operative in a first position to connect the monopole antenna through the input circuitry of the UHF tuner to the VHF tuner so that the monopole antenna provides UHF and VHF television signal inputs to UHF and VHF tuners. In the second position, the first and second pairs of external antenna terminals are individually connected to the appropriate one of the UHF and VHF tuners.

4 Claims, 1 Drawing Figure

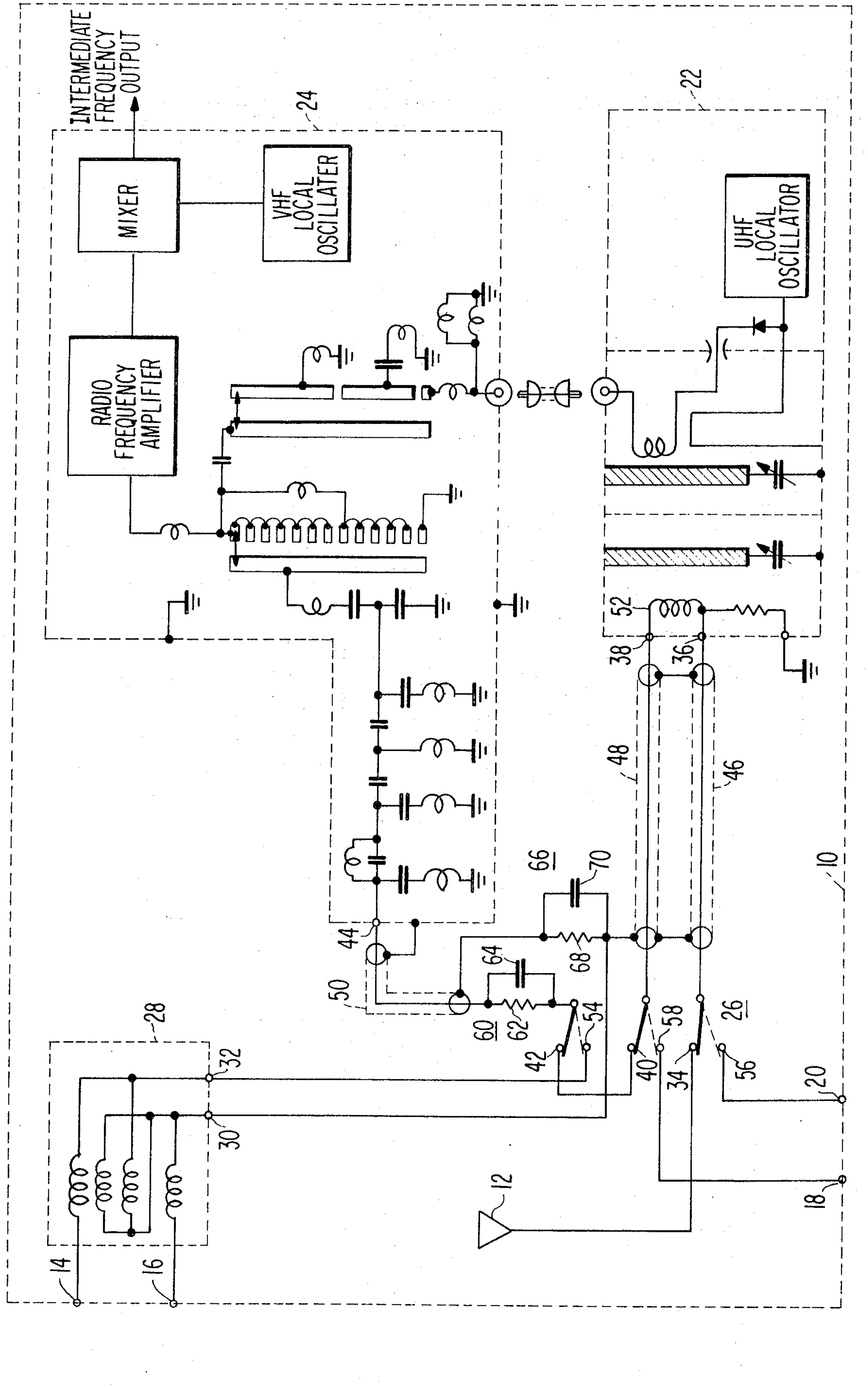
INTERMEDIATE FREQUENCY OUTPUT
MIXER
VHF LOCAL OSCILLATER
RADIO FREQUENCY AMPLIFIER
UHF LOCAL OSCILLATOR

SWITCHABLE ANTENNA CIRCUIT FOR TELEVISION PROVIDING FOR RECEPTION OF UHF AND VHF SIGNALS UTILIZING A SINGLE BUILT-IN MONOPOLE ANTENNA OR TWO EXTERNAL ANTENNAS

The present invention relates to antenna circuitry for television receivers having both a UHF tuner and a VHF tuner.

Most television receivers produced for use in the United States are capable of receiving both UHF (ultra high frequency) and VHF (very high frequency) signals. Many of these receivers have built-in antennas in addition to terminals for connection to external (e.g., rooftop) antennas. Typically, the built-in antennas provided for a television receiver include a monopole or dipole assembly for VHF signals and a separate loop for UHF signals. The built-in antennas have terminals which may be selectively connected to the external antenna terminals when the receiver is in a location where the use of the external antenna is inconvenient.

Antenna circuitry embodying the present invention is adapted for use with UHF-VHF television receivers of the type for operation from both built-in and external antennas. The built-in antenna is a monopole which may be selectively connected by a switch through the input circuitry of the UHF tuner to the VHF tuner to provide a common source of received signals for both tuners. The switch is also operable to couple the tuners to different pairs of antenna terminals which may be coupled to the external UHF and VHF antenna.

The use of a single built-in antenna has several advantages as compared to television apparatus using separate built-in antennas for UHF and VHF reception. Among these advantages are the styling flexibility and improved portability afforded by the use of a single antenna. In addition, the single built-in antenna in conjunction with the internal-external antenna switching circuitry embodying the invention leads to less confusion on the part of the viewer in establishing the appropriate antenna connections for proper television reception.

The sole FIGURE is a schematic circuit diagram, partially in block form, of a television receiver including UHF-VHF antenna circuitry embodying the invention.

The television receiver 10 is provided with a built-in antenna 12 of a type commonly referred to as a monopole antenna. In the event that the user desires better signal reception, provision is made for the connection of an external VHF antenna to the terminals 14 and 16 or an external UHF antenna to the terminals 18 and 20. It will be understood that the use of an external antenna will limit the location where the receiver may be used to those where the antenna lead-in transmission lines are conveniently available.

A television receiver includes a UHF tuner 22 and a VHF tuner 24 which operate in any suitable manner to convert received UHF or VHF signals to intermediate frequencies in the 40 MHz frequency range.

A switch 26 for switching between the built-in monopole antenna 12 and the external UHF and VHF antenna terminals is conveniently located the back panel of the television receiver, adjacent the two pairs of external antenna terminals. The advantage of locating switch 26 adjacent the external antenna terminals is to maintain short lead lengths there between.

A balun 28 is connected between the external VHF antenna terminals 14 and 16 and a pair of terminals 30 and 32 to transform the 300 ohm impedance of a balance line from the external antenna to a 75 ohm impedance at the terminals 30 and 32. In addition, the balun 28 converts the VHF signals which are balanced with respect to ground at the terminals 14 and 16 to signals which are unbalanced with respect to ground at the terminals 30 and 32. The balun 28 being positioned in close proximity to the external VHF terminals 14 and 16 minimizes the length of the 300 ohm transmission line within the receiver cabinet to avoid the generation of undesirable beat frequency components.

Switch 26 is operable between a first mode (position) and a second mode to establish whether the monopole antenna 12 or the external antennas will be used with the receiver. In the first mode, as shown, the monopole antenna is connected by a first section 34 of switch 26 to a first input terminal 36 of the UHF tuner 22. A second UHF tuner input terminal 38 is connected through second section 40 and third section 42 of the switch 26 to the input terminal 44 of the VHF tuner 24. Since the VHF and UHF tuners may be located in the receiver cabinet some distance from the switch, these connections are made by coaxial cables 46, 48 and 50.

In the first mode, signals intercepted by the monopole antenna 12 are conveyed through the switch section 34 and coaxial cable 46 to the input terminal 36 of the UHF tuner. An inductive element 52, which forms a portion of the input circuit of the UHF tuner, is connected between the UHF tuner terminals 36 and 38. The inductive element 52 in conjunction with the various distributed and lumped capacities in the circuit operates effectively as a low pass filter so the VHF signals are passed through the coaxial cable 48, switch sections 40 and 42, and coaxial cable 50 to the VHF tuner input terminal 44. UHF signals are developed across the inductor 52 and are processed by the UHF tuner in the usual manner.

A switch 26 is operable in the second mode (position), shown in dashed lines, to connect the VHF tuner input terminal 44 to the balun terminal 32 by means of switch section 54 and through balun 28 to the VHF antenna input terminals 14 and 16. In addition, the UHF tuner input terminals 36 and 38 are connected through the switch sections 56 and 58 to the external UHF antenna terminals 20 and 18, respectively.

Capristor 60, comprising a parallel combination of resistors 62 and capacitor 64, and capristor 66, comprising a parallel combination of resistor 68 and capacitor 70, are required by Underwiters' Laboratory on television receivers operating with one side of the AC power line connected to the television chassis ground (reference potential) in order to prevent electrical shock to the operator. Therefore, a transformer powered receiver would not require these capristors and they would be replaced by a wire jumper.

One particular configuration corresponding to that illustrated in the FIGURE is set forth below in terms of component values.

PARTS LIST

| | |
|---|---|
| Resistor 62 | 3.0 megohms |
| Capacitor 64 | 470 picofarads |
| Resistor 68 | 3.0 megohms |
| Capacitor 70 | 470 picofarads |

We claim:

1. In a television receiver of the type including a built-in monopole antenna, the combination comprising:

a reference potential terminal;

A VHF tuner having a first input circuit, said first input circuit having a relatively high impedance at VHF frequencies and a relatively low impedance at UHF frequencies;

a UHF tuner having a second input circuit, said second input circuit having a relatively high impedance at UHF frequencies and a relatively low impedance at VHF frequencies;

a first pair of antenna terminals for connection to an external VHF antenna;

a second pair of antenna terminals for connection to an external UHF antenna; and switching means operable between a first mode and a second mode, said switching means in said first mode connecting a series combination of said first input circuit and said second input circuit between said monopole antenna and said reference potential terminal to provide reception of VHF or UHF signals via said monopole antenna, said switching means in said second mode connecting said first pair of antenna terminals to said first input circuit and connecting said second pair of antenna terminals to said second input circuit.

2. The combination as defined in claim 1 wherein said first and second pair of antenna terminals are mounted on a back panel of said television receiver, and said switch means is located on said back panel adjacent said first and said second pair of antenna terminals.

3. The combination as defined in claim 1 including a balun transformer coupled between said first pair of antenna terminals and said switch means such that said first pair of antenna terminals are operably connected through said balun transformer to said first input circuit when said switch means is in said second mode.

4. The combination as defined in claim 3 wherein said switch means is coupled to said second input circuit by means of coaxial cable and wherein said switch means is coupled to said first input circuit by means of coaxial cable.

* * * * *